United States Patent [19]

Muto

[11] 4,442,926
[45] Apr. 17, 1984

[54] SIMPLIFIED HYDRAULIC DAMPER
[75] Inventor: Toshiaki Muto, Kamakura, Japan
[73] Assignee: Tokiko Kabushiki Kaisha, Japan
[21] Appl. No.: 516,864
[22] Filed: Jul. 25, 1983

Related U.S. Application Data

[63] Continuation of Ser. No. 269,596, Jun. 2, 1981, abandoned.

[30] Foreign Application Priority Data

Jun. 6, 1980 [JP] Japan ............................ 55-79038[U]

[51] Int. Cl.³ ............................................... F16F 9/19
[52] U.S. Cl. ............................... 188/317; 188/322.15;
188/282; 267/64.15
[58] Field of Search ............... 188/282, 316, 317, 320,
188/322.13, 322.15, 322.22, 281; 267/64.15,
64.26

[56] References Cited

U.S. PATENT DOCUMENTS

| | | | |
|---|---|---|---|
| 3,570,635 | 3/1971 | Takagi | 188/282 |
| 3,763,970 | 10/1973 | Anderson | 188/282 |
| 4,185,356 | 1/1980 | Kuivalainen et al. | 188/282 |
| 4,356,898 | 11/1982 | Guzder et al. | 188/282 |

FOREIGN PATENT DOCUMENTS

| | | | |
|---|---|---|---|
| 2519372 | 11/1976 | Fed. Rep. of Germany | 267/64.26 |
| 2315638 | 1/1977 | France | 188/282 |
| 571871 | 1/1958 | Italy | 267/64.15 |
| 47-48229 | 12/1972 | Japan | 267/64.26 |
| 53-85490 | 7/1978 | Japan . | |
| 767977 | 2/1957 | United Kingdom | 188/282 |
| 1227949 | 4/1971 | United Kingdom | 267/64.26 |
| 1232236 | 5/1971 | United Kingdom | 267/64.26 |

*Primary Examiner*—Douglas C. Butler
*Assistant Examiner*—R. R. Diefendorf
*Attorney, Agent, or Firm*—Parkhurst & Oliff

[57] ABSTRACT

A hydraulic damper comprising a tube with a bottom end thereof closed for containing hydraulic oil therein, a piston slidably fitted in the tube and partitioning the tube into upper and lower chambers which are filled with oil, a piston rod having one end thereof being secured to the piston by a hollow nut having a cavity opening to the lower chamber therein which is located on the side of lower chamber and the other end thereof projecting to the outside through a rod guide and sealing member which are fixed to the upper end of the tube and which seal the upper end of the tube, a pressurized gas chamber provided on the side of the lower chamber for compensating the changed volume of the piston rod within the tube, a first communicating path provided in the piston for communicating the upper and lower chambers, a second communicating path which serves to communicate the upper and lower chambers via the cavity provided in the hollow nut and which is provided in the piston rod on the side of the piston and the hollow nut, valves provided in the first and second communicating paths and serving to open in the opposite directions and serve to close or open the first and second communicating paths, whereby the damping force is generated when the oil filled into the tube flows from the upper chamber to the lower chamber and vice versa.

14 Claims, 5 Drawing Figures

SIMPLIFIED HYDRAULIC DAMPER

This is a continuation of application Ser. No. 269,596 filed June 2, 1981, now abandoned.

BACKGROUND OF THE INVENTION (1) The present invention relates to hydraulic dampers mountable on vehicles or aircraft to damp or alleviate the mechanical vibrations associated therewith.

(2) There has been proposed a hydraulic damper of the gas enclosed type comprising a piston slidably housed in a tube. A piston-rod is fitted to the piston, partitioning the tube into upper and lower chambers, which are filled with oil and which are communicated with each other via a passage provided in the piston-rod. A valve mechanism for generating a damping force in such a hydraulic damper is disclosed, for instance, in Japanese Utility Model Application Laid-open No. 85490/1978. That application proposes an arrangement wherein a leaf valve is disposed between a disk plate slidably installed in a hollow nut. A valve seat is stationarily installed within the hollow nut so as to constitute an expansion-side valve which can also function as a damper, even when the expansion stroke is abrupt (the term "expansion-side damping valve" is herein intended to mean a valve which opens only when the piston-rod moves in the expansion direction, A, relative to the tube). In the proposed hydraulic damper, however, the inside surface of the hollow nut in which the disk plate has to slide must be finished with high precision. Additionally, the disk plate has a tendency to incline and scrape the inside surface of the hollow nut, thereby rendering the damper function unstable. To avoid the above-mentioned difficulties, high precision finishing of the damper parts is demanded as well, increasing the cost of the device.

SUMMARY OF THE INVENTION

The primary object of the present invention is to provide a hydraulic damper which is easily produced in that highprecision work is not required.

Another object of the invention is to provide hydraulic damper having reduced production costs because highprecision work is not required.

Still another object of the invention is to provide a hydraulic damper which is simple in structure and stable in performance.

The hydraulic damper according to the present invention is characterized in that the extension-side damping valve is comprised of a disk valve and a valve seat which are fixed within the hollow nut, thereby dispensing with any slidable parts in the hollow nut and thus making it possible to reasonably reduce the production cost of the unit. High-precision work is not required in finishing the inside surface of the hollow nut and stable performance can be guaranteed.

Other objects and features will become apparent from the following description with reference to the attached drawings.

DETAILED DESCRIPTION OF THE INVENTION

Figure 1:
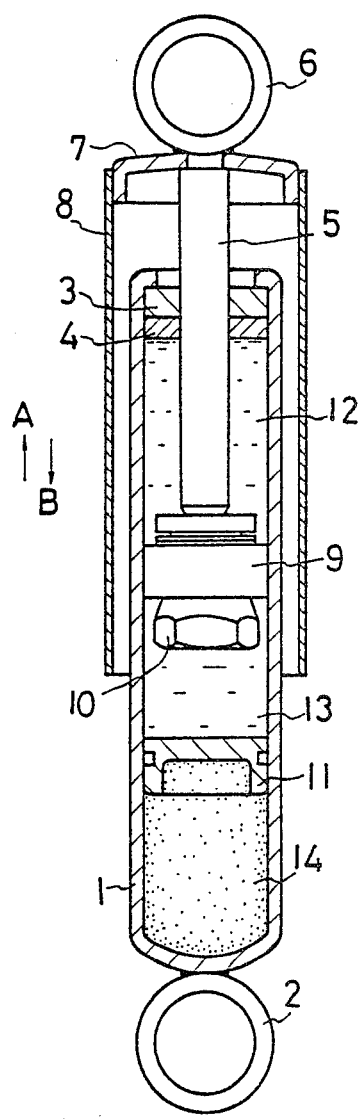
FIG. 1 is a whole longitudinal section view of a hydraulic damper according to the present invention.
Figure 2:
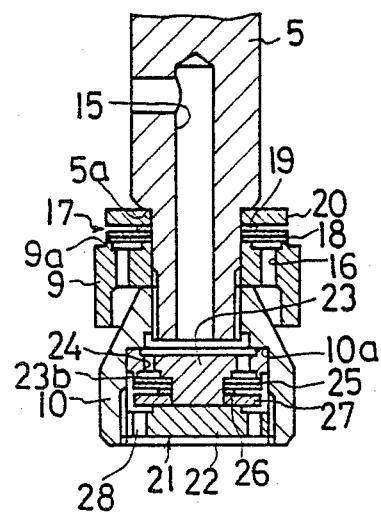
FIG. 2 is a longitudinal section view of a piston and a hollow nut shown in FIG. 1.

FIGS. 1 and 2 illustrate one embodiment of the present invention. A tube 1 has its bottom end thereof closed. A mounting ring 2 is carried by the bottom end of the tube, and a rod guide 3 and a sealing member 4 are fixed to a top end of the tube. A piston rod 5 is slidably movable in the directions denoted by arrows A and B through the rod guide 3 and the sealing member 4, and projects outside of the tube 1. A mounting ring 6 is secured to the outer end of the piston rod 5. Also, a cap 7 is attached to the outer end of the piston rod 5. A dust cover 8 is attached to the cap 7.

A piston 9 is mounted on the inner end of the piston rod 5 by means of a hollow nut 10 with a cavity screwed to the inner end tip of the piston rod 5. The configuration of this part will be described later. Between the bottom of the tube 1 and the piston 9 there is installed a free piston 11 which is slidable in the directions denoted by arrows A and B. A space defined between the piston 9 and the sealing member 4 constitutes an upper piston chamber 12, while a space defined between the piston 9 and the free piston 11 constitutes a lower piston chamber 13. A space defined between the bottom of tube 1 and the free piston 11 constitutes a pressurized gas chamber 14. The piston chambers are filled with oil, while the gas chamber 14 holds a high-pressure gas sealed therein.

At the inner end of the piston rod 5 there is formed a communicating path 15 which establishes fluid communication between the cavity in the hollow nut 10 and the upper piston chamber 12. Within the piston 9 there is formed a communicating path 16 which established fluid communication between the upper piston chamber 12 and the lower piston chamber 13. On the periphery of the piston rod 5 and at the top of the piston 9 there is installed a contraction-side damping valve 17 (the term "contraction-side damping valve" is herein intended to mean a valve which opens only when the piston-rod moves in the contraction direction, B, relative to the tube). The damping valve 17 comprises a disk valve 18 suitable to open or close the communicating path 16 in the piston 9, a retainer 19 which functions as a fulcrum for deflection of the disk valve 18, and a washer 20 to prevent an excess-deflection of the disk valve 18. The disk valve 18, the retainer 19 and the washer 20 are sandwiched and fixed in a stepped portion 5a in the piston rod 5 and the piston 9. The washer 20 also serves to stop or limit the expansion stroke by bearing against the sealing member 4. The cavity of the hollow nut 10 holds an expansion-side damping valve 21. The expansion-side damping valve 21 comprises a valve seat 23 fixedly mounted in the nut 10 by means of a screw member 22 screwed in the cavity of the hollow nut 10, a disk valve 25 suitable to open or close the communication path 24 formed in the valve seat 23, a retainer 26 to serve as a fulcrum for deflection of the disk valve 25, and a washer 27 to prevent an excess-deflection of the disk valve 25. The valve seat 23, the disk valve 25, the retainer 26 and the washer 27 are sandwiched in the stepped portion 10a in the hollow nut 10 and the screw member 22. Within the screw member 22 there is formed a communication path 28 establishing communication between the inside of the hollow nut 10 and the lower piston chamber 13.

Next, the operation of the hydraulic damper as set forth above is described. First, in the expansion stroke, the piston 9 together with the piston rod 5 move in the direction of arrow A relative to the tube 1. A pressure thereupon builds up in the upper piston chamber 12 and in consequence the disk valve 25 deflects around the retainer 26. The communication path 24 in the valve seat 23 thereby opens. The oil in the upper piston chamber 12 flows into the lower piston chamber 13 via the paths 15,24, the cavity of the hollow nut 10, and the path 28. At the same time, the gas chamber 14 expands to compensate for the changed volume of the pistion rod 5 within the upper piston chamber 12, while the free piston 11 moves in the direction A to compensate for the created negative pressure. Thus, when the oil deflects the disk valve 25 and flows into the path 24, a damping force in the expansion stoke is generated. In the contraction stroke, on the contrary, the piston 9 together with the piston rod 5 move in the direction of arrow B relative to the tube 1. The oil in the lower piston chamber 13 is then caused to flow into the upper piston chamber 12 via the path 16 formed in the piston 9. The pressure of the oil causes the disk valve 18 to deflect around the retainer 19 as the fulcrum, whereupon the path 16 of the piston 9 opens, permitting the oil in the lower piston chamber 13 to go into the upper piston chamber 12 via the path 16. At the same time the gas chamber 14 contracts by a volume equivalent to the volume of intrusion of the piston rod 5 into the upper piston chamber 12, thereby causing the free piston 11 to move in the direction B to compensate for the changed volume of the piston within the tube. As the result of the oil deflecting the disk valve 18 and flowing into the communicating path 16, a damping force in the contraction stroke is generated. In this manner, the damping forces are generated when the oil deflects the disk valve 25 or 18 and flows into the path 24 or 16, respectively. Accordingly, a good damping performance can be attained regardless of the suddenness of the expansion or contraction stroke.

It is obvious that the same effect in the above embodiment can be realized when the disk valve 18 is installed below the piston 9 to open or close the path 16, while the disk valve 25 is installed above the valve seat 23 to open or close the path 24.

Figure 3:
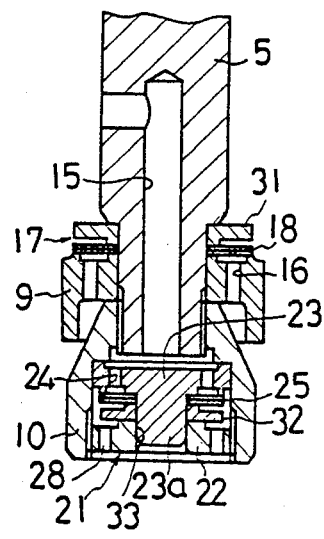
FIG. 3 is a longitudinal section view of a variation of the piston and hollow nut in the hydraulic damper according to the present invention.
Figure 4:
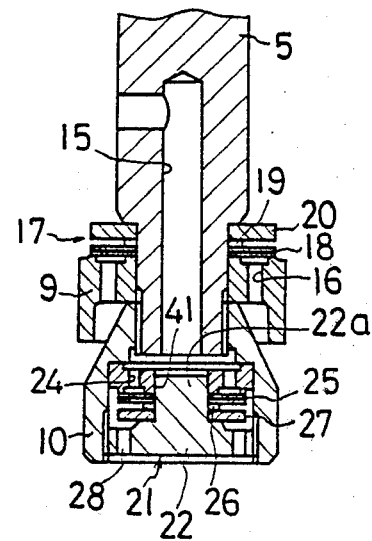
FIG. 4 is a longitudinal section view of another variation of the piston and hollow nut in the hydraulic damper according to the present invention.
Figure 5:
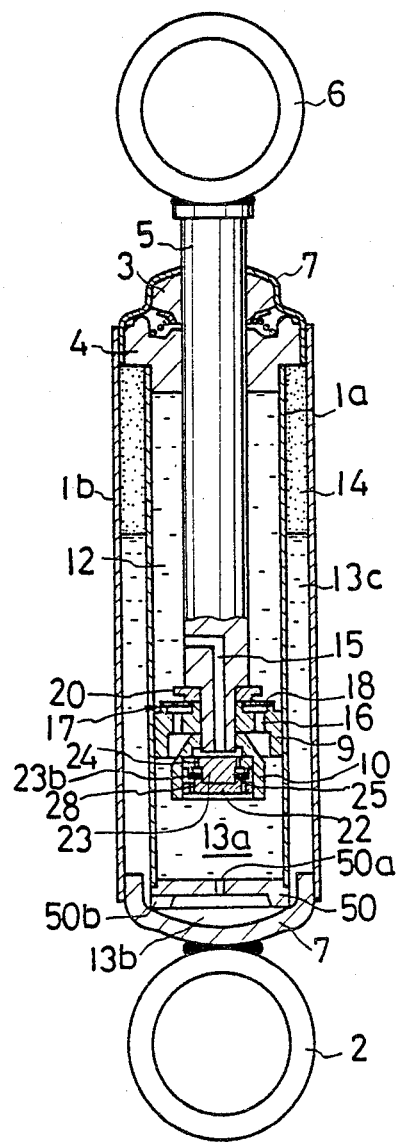
FIG. 5 is a whole longitudinal section view of still another embodiment of the hydraulic damper according to the present invention.

In FIGS. 3-5 showing other embodiments of the present invention, the same or similar parts as in the first embodiment are given the same numerals. FIG. 3 illustrates a second embodiment of the present invention. In this embodiment, the separate members, i.e., retainers 19,26 and washers 20,27 (in the first embodiment) are made of the same pieces 31 and 32, respectively. Meanwhile, through-hole 33 is bored in the screw member 22 and into this hole 33 a part 23a of the valve seat 23 (a fixture for the disk valve 25 and the member 32) is pressed.

Thus the number of components can be reduced and a preassembly of parts inside the hollow nut 10 is possible.

FIG. 4 illustrates a third embodiment of the present invention. In this case, through-hole 41 is bored in the valve seat 23. A part 22a of the screw member 22 is pressed into the through-hole 41. The disk valve 25, the retainer 26, and the washer 27 are fitted in advance of the part 22a.

In this way, the whole surface of the valve seat 23 can be easily finished flat.

FIG. 5 illustrates a fourth embodiment of the invention characterized by the non-existence of a free piston in the hydraulic damper without deterioration of the damping effects. In this embodiment, because there is no free piston provided in the hydraulic damper, the body of the hydraulic damper is composed of a double tube consisting of the inner tube 1a and the outer tube 1b; the lower piston chamber 13 is divided into the parts 13a, 13b and 13c; and a pressurized gas chamber 14 is formed in the upper portion of the gap between the inner tube 1a and the outer tube 1b.

The partitioning member 50 separates the lower piston chamber into 13a and 13b, and is installed at the lower end of the inner tube 1a. An orifice 50a to communicate 13a with 13b is bored in the partitioning member 50. The orifice 50a is designed to maintain the liquid pressure during the contraction stroke high enough for the chamber 13a to deflect the damping valve 18. Meanwhile on the underside of the partitioning member 50 there is formed a communicating path 50b, which communicates 13b with 13c. The piston-hollow nut assembly attached to the lower end of the piston rod 5 in FIG. 5 is schematically simplified, but it is essentially the same as the one illustrated in FIG. 2. Thus the present embodiment is functionally the same as the ones illustrated in FIGS. 1 and 2.

As described above, since in the present invention, the expansion-side damping valve is constructed by fixedly providing the disk valves and the valve sheets within the hollow nut, there is no part slidably movable within the hollow nut. Therefore, the inside face of the hollow nut need not be finished with very high precision and a cost reduction can be reasonably achieved without sacrificing the stable operation of the damper.

It is apparent that different variations of the embodiment are feasible without departing from the spirit and scope of the present invention and therefore the present invention is not restricted to the specific embodiments and should be limited only as specified in the attached claims.

What is claimed is:

1. A hydraulic damper comprising:
   a tube with a bottom end thereof closed and defining a working space therein;
   a piston slidably movable within the working space of the tube and dividing the working space into upper and lower chambers which are at least partially filled with hydraulic fluid;
   a piston rod, the piston secured to an end thereof by a hollow nut having a cavity therein opening toward the lower chamber, such that the piston is disposed between the piston rod and the hollow nut, the other end of the piston rod extending outside the tube through a rod guide and a sealing member which are fitted to a mouth end of the tube and which serve to guide the piston rod and maintain the sealing engagement among the tube, the piston rod and the sealing member;
   a first communication path provided in the piston through the thickness of the piston to communicate the upper and lower chambers therethrough;

a second communication path comprised of the cavity in the hollow nut and a hole bored in the piston rod, one end of the hole being opened to the upper chamber and the other end being opened to said cavity;

first and second damping valve means adapted to open and close the first and second communication paths respectively;

said second damping valve means being located within the cavity of said hollow nut and comprising a disc valve, a valve seat, and a screw member;

said disc valve being fixedly sandwiched between said valve seat and said screw member within said cavity of said hollow nut;

said first damping valve means being provided in the first communication path and being adapted to communicate the upper and lower chambers in a contraction stroke;

said second damping valve means being adapted to communicate the upper and lower chambers in an extension stroke;

and means for urging the hydraulic fluid in the lower chamber upwardly so as to compensate the varied volume of the piston rod within the tube as the piston rod enters or retracts from the tube, said means being located adjacent to the lower chamber.

2. The hydraulic damper claimed in claim 1, wherein said valve seat is placed on the bottom of the cavity and said screw member is secured inside of the cavity toward the valve seat, while the first damping valve means comprises a second disc valve disposed between the piston and a shoulder provided on the piston rod.

3. The hydraulic damper claimed in claim 1 or 2, wherein said first damping valve means provided in the first communication path comprises a washer, a spacer and a disc plate placed in that order between the piston and a shoulder of the piston rod.

4. The hydraulic damper claimed in claim 3, wherein the washer and spacer of the first damping valve means are integrally formed.

5. The hydraulic damper claimed in claim 4, wherein the second damping valve means provided in the second communication path further comprises a retainer and a washer placed in that order between the disc valve and the screw member.

6. The hydraulic damper claimed in claim 5, wherein the retainer and the washer are integrally formed.

7. The hydraulic damper claimed in claim 3, wherein the second damping valve means provided in the second communication path further comprises a retainer and a washer placed in that order between the disc valve and the screw member.

8. The hydraulic damper claimed in claim 7, wherein the retainer and the washer are integrally formed.

9. The hydraulic damper claimed in claim 2, wherein the second damping valve means provided in the second communication path further comprises a retainer and a washer placed in that order between the disc valve and the screw member.

10. The hydraulic damper claimed in claim 9, wherein the retainer and the washer are integrally formed.

11. The hydraulic damper claimed in claim 2, wherein the valve seat is secured within the cavity of the hollow nut by screwing the screw member to the inner face of said cavity.

12. The hydraulic damper claimed in claim 2, wherein the valve seat is secured to the cavity by press forcing the screw member toward the valve seat.

13. The hydraulic damper claimed in claim 1 or 2, wherein said compensating means comprises a free piston disposed movably between the lower chamber and the bottom of the tube and a pressurized gas fills the tube between the free piston and the bottom of the tube.

14. The hydraulic damper claimed in claim 1 or 2, wherein said compensating means comprises a partitioning plate positioned underneath the lower chamber and having a damping orifice, an auxiliary tube surrounds said tube defining a working space in sealing engagement and communicates with a space between the partitioning plate and the bottom end of said tube defining a working space, said auxiliary tube being charged with a pressurized gas.

* * * * *